July 21, 1970 J. M. PROUD, JR 3,521,121

OXYGEN CONTAINING, SUPERATMOSPHERIC ENVELOPE USED AS A PULSE GENERATOR

Filed July 5, 1968

JOSEPH M. PROUD, Jr.
INVENTOR.

BY Robert J. Schiller
ATTORNEY.

United States Patent Office 3,521,121
Patented July 21, 1970

3,521,121

OXYGEN CONTAINING, SUPERATMOSPHERIC ENVELOPE USED AS A PULSE GENERATOR

Joseph M. Proud, Jr., Wellesley, Mass., assignor to Ikor Incorporated, Burlington, Mass., a corporation of Massachusetts Filed July 5, 1968, Ser. No. 742,691
Int. Cl. H03b *11/02*
U.S. Cl. 315—58 5 Claims

ABSTRACT OF THE DISCLOSURE

A pulse generator, particularly useful for synthetic generation of microwaves, in the form of a superatmospheric air-filled elongated tube having coaxial conductors. The outer conductor is insulated from the inner conductor, and the latter includes a small, air-filled gap of less than 4 mil inches. The central conductor facing one end of the gap is a short (ca. 1 inch) charging line connected in series to a current limiting high resistive impedance. Due to the high pressure, short space gap, the pulses produced can exceed several kv. pulse amplitude when the device is powered from a high voltage source applied across the outer conductor and the current limiting impedance.

This invention relates to pulse generating devices and more particularly to pulse generator devices useful in the production of microwave signals.

A known technique for producing microwave pulse bursts is to generate repetitive pulses and feed them to a filter. An appropriately selected filter will then provide bursts, each corresponding to an input pulse, of microwave energy. The microwave energy is a function of the rise time and amplitude of the input pulse. Generally more energy at higher frequency may be generated as the rise time of the input pulse is reduced and its amplitude increased. A discusion of a typical technique of this type appears in the article by G. F. Ross in IEEE Transactions on Microwave Energy and Techniques, September 1965, pp. 704–706.

Pulses with rise times in the pico-second range can be obtained from generators employing solid state switches which operate quite rapidly. However, these switches are limited in the magnitude of voltages which can be tolerated without breakdown, so the microwave generation is typically limited to a few watts maximum output power. Pulse generators of the prior art capable of switching much larger potentials are comparatively slow. Thus, the power output of the filter can be high but the frequency in the bursts is quite low and may not qualify as microwaves.

A principal object of the present invention is to provide pulse generation devices capable of yielding pulses with very short rise times and yet which are of very high voltage.

Other objects of the present invention is to provide a pulse generation device which is simple and inexpensive; and to provide a device of the type described for converting a D.C. potential into fast rise time pulses at a high repetition rate.

These and other objects of the invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims. For a fuller understanding of the nature and objects of the present invention, reference should be had to the following detailed description taken in connection with the accompanying drawings wherein:

Generally, the foregoing objects of the present invention are realized with a device comprising a gas-tight envelope having disposed at opposite ends thereof respectively electrical output and input terminals. The input terminal is connected inside the envelope through a high resistive impedance to a charge storage element. The latter, preferably a single elongated conductor is spaced by a short gap from the output terminal. The interior of the envelope is charged with an oxygen-containing gas at superatmospheric pressure.

Figure 1:
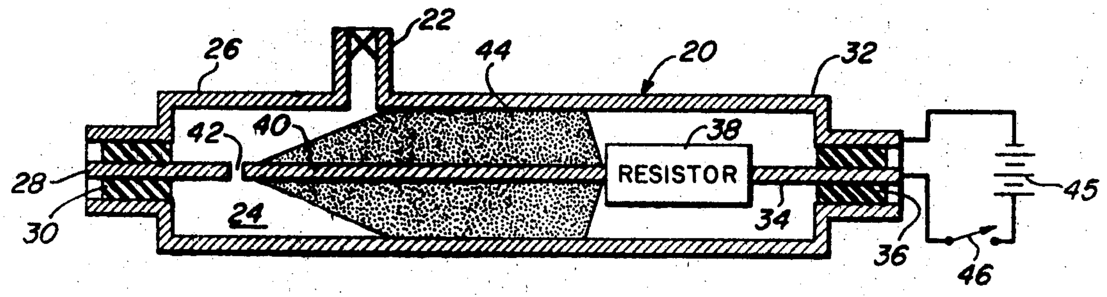
FIG. 1 is a diagram partly in cross-section and partially schematic showing the structure of a preferred embodiment of the invention.

Turning now specifically to FIG. 1, there is shown an embodiment of the invention which includes an elongated, hollow, gas-tight envelope 20. At some intermediate position between the ends of envelope 20, sealable port 22 can be provided so that interior 24 of the envelope can be charged or filled with air or some other oxygen-containing gas at superatmospheric pressure. In a typical embodiment, the interior of envelope 20 is filled with air at about 50 p.s.i.

In the form shown, envelope 20 is made primarily of an electrically conductive material such as copper, stainless steel or the like. Alternatively, the envelope can be made of an insulating material such as glass, ceramic or the like, but in such cases it should be further surrounded by an electrically conductive shield for reasons that will appear later.

One end 26 of envelope 20 has mounted therein an electrically conductive output terminal 28 preferably in the form of an elongated conductor aligned along the long axis of the envelope. Terminal 28 is electrically insulated from the envelope by a coaxial bushing 30 of appropriate material such as glass, polytetrafluorethylene or the like. The other end 32 of envelope 20 is similarly provided with an elongated input terminal 34 colinear with terminal 28 and electrically insulated from the envelope by bushing 36. Both terminals therefore provide electrical pathways from the interior to the exterior of the envelope.

The end of terminal 34 disposed within interior 24 of envelope 20 is electrically connected to and mechanically supports one side of resistive impedance 38. The other side of impedance 38 is connected to one end of elongated line storage element 40 which is shown as a length of electrically conductive material also disposed colinearly with terminals 28 and 34. The other end of element 40 is separated from the inner end of terminal 28 by a short gap 42 which of course is filled with oxygen-containing gas at superatmospheric pressure. Preferably the facing ends of element 40 and terminal 28 are formed of low-emissivity, refractory, conductive material such as tungsten or the like. The spacing between element 40 and terminal 28 importantly is less than about 3 to 4 mil inches.

In one embodiment of the invention, the interspace between element 40 and the interior wall of envelope 20 is provided with material 44 which provides mechanical support to keep element 40 properly aligned and also is microwave energy absorbing, e.g. an epoxy resinous filler which can be slotted to allow uniform gas pressure distribution within the envelope if desired.

It will be seen that end 32 of the envelope together with terminal 34 can readily be formed as a coaxial connector as can terminal 28 and end 26, and the envelope and inner conductors in effect form a coaxial transmission line. Thus, as well known, the dimensions and spacing of envelope 20, and the central conductors depends upon the transmission line impedance desired. Design of the coaxial output connector formed of terminal 28, dielectric 30 and end 26 of the envelope, requires that it provides a uniform transmission line impedance, typically 50Ω, matching that of the device into which the pulse energy is to be fed. The electrical length of element 40 determines the length or duration of the pulse produced.

Figure 2:
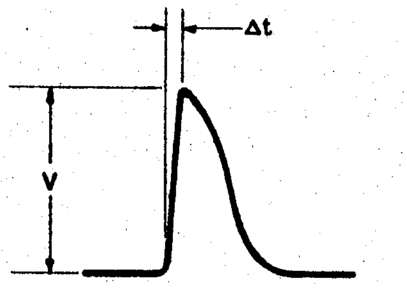
FIG. 2 is a typical waveform of the output signal from the invention.

In operation envelope 20 is connected to one polarity of a D.C. source such as a power supply shown schematically as battery 45 and terminal 34 connected to the opposite pole as through switch 46. The voltage of the D.C. source then applied through current limiting impedance 38 charges element 40. Typically, impedance 38 is of the order of 10 megohms. The charge element 40 builds up until dielectric breakdown occurs across gap 42. The latter, being very short, insures that the rise time of the resulting pulse (shown as the left-hand edge of FIG. 2) is very short. For example, with a 3 mil inch gap and a maximum amplitude V of 5 kv. for the pulse of FIG. 2, the rise time $\Delta t$ will be around 100 picoseconds.

The discharge across the gap decays rapidly as the charge on element 40 is dissipated and particularly because the oxygen-containing gas will not remain ionized and fails to support or quenches the discharge as soon as the potential drops. Other gases, such as nitrogen, will remain ionized such that a continuous arc will occur as long as switch 46 remains closed, so that no repetitive pulses are formed. In the present invention however, as soon as discharge is complete and the dielectric in the gap self-repairing, element 40 begins to recharge. Upon complete recharge, another pulse is formed and the cycle is repeated, providing a train of pulses. The pulse length is determined by the transit time required for a charge to traverse element 40, hence is equal to twice the length of element 40. For example, for a short pulse in the subnanosecond range, element 40 will be about 1 inch long. Thus, element 40 is preferably from ½" to 2" long. Typically, power supply 45 will supply power which will charge element 40 to about 5 kv., at which voltage breakdown occurs at gap 42 when the latter is dry-air filled and is less than 4 mil inches. The high value of impedance 38 (from about 5 to 100 megohms and typically 10 megohms) prevents or limits continuous current flow which would tend to sustain arcing across gap 42. The value of impedance 38 also limits the time required to charge element 40 and hence establishes the repetition rate at which pulses occur, typically in the 10–20 kHz. range for the values above noted.

The use of superatmospheric pressure is important inasmuch as the higher pressures tend to stabilize the pulse shape from pulse to pulse, particularly the maximum amplitude of the pulses. The spacing of gap 42 is also important in that very short spacing, i.e. $<$3–4 mil inches, provide the desired very high pulse rise times ranging around 100 picoseconds. The use of microwave energy absorbing material 44, while optional, reduces noise or echoes produced by reflection in element 40 from gap 42 or from the output load into which the pulse is fed.

Figure 3:
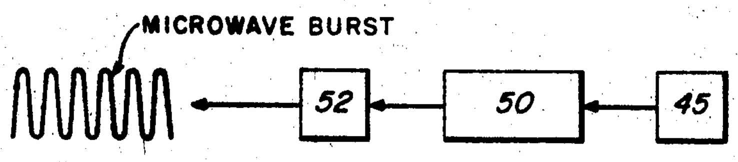
FIG. 3 is a block diagram showing the use of the invention in generating bursts of microwave energy.

An exemplary usage of the generator of the invention is shown in FIG. 3 wherein power supply 45 is connected to generator 50. The latter can be considered the same as that shown in cross-section in FIG. 1. The pulse output end of generator 50 is connected to a filter circuit 52 such as that described in the article of Ross, supra. Each pulse provided by generator 50 is thus transformed by filter circuit 52 into a burst of microwaves, the number of cycles of which depend on the number of waveforming stubs in the filter. While generally this system can be considered within the prior art, specifically it differs considerably in that generator 50 of the invention is, as above noted, quite capable of inserting pulses exceeding at least 1 kv. peak and indeed of several kv., and with rise times around 100 picoseconds. Hence the power in the microwave bursts from filter circuit 52 can far exceed anything hitherto known in connection with similar circuits.

Since certain changes may be made in the above apparatus without departing from the scope of the invention herein involved, it is intended that all matter contained in the above description or shown in the accompanying drawing shall be interpreted in an illustrative and not in a limiting sense.

What is claimed is:

1. A pulse generator comprising a sealable elongated envelope containing therein an oxygen-containing atmosphere at superatmospheric pressure:

a pair of coaxial spaced-apart conductors extending along said envelope, at least the inner conductor being disposed within said envelope and having opposite ends extending outwardly from corresponding ends of said envelope;

said inner conductor having a gap therein of less than about 4 mil inches, a charge-storage section immediately adjoining said gap, and a resistive impedance coupled between said charge storage section and a corresponding end of said inner conductor; and means for applying a high voltage DC between the outer conductor and the end of the inner conductor directly connected to said impedance.

2. A pulse generator as defined in claim 1 wherein the portions of said conductor at said gap are formed of refractory, low emissivity, material.

3. A pulse generator as defined in claim 1 wherein said charge storage section is in the range of about ½ to 2 inches long.

4. A pulse generator as defined in claim 1 wherein said impedance has a value in the range of from about 5 to 100 megohms.

5. A pulse generator as defined in claim 1 including microwave-energy-absorbing, electrically-insulating material surrounding said charge storage section except for the ends thereof.

References Cited

UNITED STATES PATENTS

| | | | |
|---|---|---|---|
| 2,412,659 | 12/1946 | Thomas | 315—39 X |
| 2,769,909 | 11/1956 | Radmacher | 307—106 X |
| 2,813,226 | 11/1957 | Scott | 315—58 |
| 2,830,231 | 4/1958 | Scott | 315—39 X |
| 3,295,062 | 12/1966 | Froome | 331—127 X |
| 3,360,678 | 12/1967 | Kerns | 307—106 X |

HERMAN O. JONES, Primary Examiner

T. B. JOIKE, Assistant Examiner

U.S. Cl. X.R.

307—106; 313—223; 331—127